United States Patent
Gorbatov et al.

(10) Patent No.: US 8,881,193 B2
(45) Date of Patent: Nov. 4, 2014

(54) METHOD AND APPARATUS FOR ENHANCING TELEVISION PROGRAMS WITH EVENT NOTIFICATIONS

(75) Inventors: Eugene Gorbatov, Hillsboro, OR (US); Juan Rivero, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 2560 days.

(21) Appl. No.: 09/910,574

(22) Filed: Jul. 20, 2001

(65) Prior Publication Data
US 2003/0018967 A1    Jan. 23, 2003

(51) Int. Cl.
| | |
|---|---|
| *H04N 7/10* | (2006.01) |
| *H04N 21/41* | (2011.01) |
| *H04N 7/16* | (2011.01) |
| *H04N 21/8543* | (2011.01) |
| *H04N 21/438* | (2011.01) |
| *H04N 21/61* | (2011.01) |
| *H04N 21/4722* | (2011.01) |
| *H04N 21/858* | (2011.01) |
| *H04N 7/088* | (2006.01) |
| *H04N 21/235* | (2011.01) |
| *H04N 21/488* | (2011.01) |
| *H04N 21/462* | (2011.01) |
| *H04N 21/81* | (2011.01) |
| *H04N 21/84* | (2011.01) |
| *H04N 21/435* | (2011.01) |
| *H04N 21/426* | (2011.01) |
| *H04N 21/4782* | (2011.01) |
| *H04N 21/475* | (2011.01) |
| *H04N 21/478* | (2011.01) |

(52) U.S. Cl.
CPC ....... *H04N 21/4263* (2013.01); *H04N 21/4126* (2013.01); *H04N 7/16* (2013.01); *H04N 21/8543* (2013.01); *H04N 21/4383* (2013.01); *H04N 21/6125* (2013.01); *H04N 21/4722* (2013.01); *H04N 21/4113* (2013.01); *H04N 21/858* (2013.01); *H04N 7/088* (2013.01); *H04N 21/235* (2013.01); *H04N 21/4882* (2013.01); *H04N 21/4622* (2013.01); *H04N 21/812* (2013.01); *H04N 21/8586* (2013.01); *H04N 21/84* (2013.01); *H04N 21/435* (2013.01); *H04N 21/478* (2013.01); *H04N 21/4782* (2013.01); *H04N 21/4753* (2013.01)
USPC ............................................. 725/33; 725/139

(58) Field of Classification Search
USPC ............... 725/32–36, 131–142; 709/217–232
See application file for complete search history.

(56) References Cited

U.S. PATENT DOCUMENTS 4,410,911 A * 10/1983 Field et al. .................... 380/238
5,469,431 A * 11/1995 Wendorf et al. .............. 370/254

(Continued)

OTHER PUBLICATIONS

"Enhanced Content Specification", Advanced Television Enhancement Forum, http://www.atvef.com, 1998-2000, pp. 1-41, version 1.1, revision 26.

*Primary Examiner* — Annan Shang
(74) *Attorney, Agent, or Firm* — Trop, Pruner & Hu, P.C.

(57) ABSTRACT

Improved enhanced TV programming provides the capability for a TV viewer watching one channel to be notified of interesting programming events happening or about to happen on other channels. The present invention overcomes the problem addressed by "surfing TV channels" by providing notifications that alert enhanced TV viewers to other programming events happening or about to happen on different channels that are not presently being watched. This enables the viewer to watch a primary program on one channel without interruption and be timely notified about interesting programming events about to occur on other channels. The viewer then may have the option of switching to another channel based on the information included with the event notification.

15 Claims, 2 Drawing Sheets

(56) References Cited

U.S. PATENT DOCUMENTS

| | | | |
|---|---|---|---|
| 5,805,822 A * | 9/1998 | Long et al. | 709/232 |
| 5,859,662 A * | 1/1999 | Cragun et al. | 725/137 |
| 6,594,498 B1 * | 7/2003 | McKenna et al. | 455/517 |
| 7,720,475 B2 * | 5/2010 | McKenna et al. | 455/435.1 |
| 8,424,040 B2 * | 4/2013 | Klosterman | 725/48 |
| 8,640,170 B2 * | 1/2014 | Klosterman | 725/48 |
| 2002/0104090 A1 * | 8/2002 | Stettner | 725/60 |
| 2002/0124252 A1 * | 9/2002 | Schaefer et al. | 725/33 |
| 2003/0204854 A1 * | 10/2003 | Blackketter et al. | 725/113 |
| 2004/0111747 A1 * | 6/2004 | Omoigui | 725/58 |
| 2005/0086688 A1 * | 4/2005 | Omoigui | 725/35 |

* cited by examiner

METHOD AND APPARATUS FOR ENHANCING TELEVISION PROGRAMS WITH EVENT NOTIFICATIONS

BACKGROUND

1. Field

The present invention relates generally to digital television and broadcast systems and, more specifically, to providing event notifications for digital television programs.

2. Description

The broadcasting industry is expanding into digital broadcast technologies that promise new features, higher resolution video and audio, and other technological enhancements. Digital television (DTV) broadcasting provides at least several advancements in broadcast content enhancement. One type of content enhancement is the addition of supplemental information to the regular broadcast transmission. Supplemental information can take many forms, such as Hypertext Markup Language (HMTL), meta-data, and other information carrying data structures. Enhanced or interactive television incorporates the supplemental information into the viewing experience through interactive displays, links to web pages on the Internet, and other features.

The Advanced Television Enhancement Forum (ATVEF) (www.atvef.org) is a cross-industry alliance of companies representing broadcast and cable networks, television transports, the consumer electronics industry, and the personal computer (PC) industry. ATVEF has defined protocols for HTML-based enhanced television, which allow content creators to deliver enhanced programming over all forms of transport (analog, digital, cable, Internet and satellite) to intelligent receivers. ATVEF has published the Enhanced Content Specification, version 1.1, revision 26, 1998-2000 (hereinafter referred to as the "ATVEF Specification") to promote consistent methods for providing enhancements in both analog and digital broadcasting systems. The ATVEF Specification provides a standard for delivering interactive TV experiences that can be authored once using a variety of tools and deployed to a variety of TV, set top box, and PC-based receivers. The ATVEF Specification specifies content formats and delivery mechanisms for the transmission and processing of triggers, resources, announcements, and content that are associated with an enhanced TV transmission. Such enhancements are often suitable for use by a computer system (such as a PC), connected to the Internet or other network. For example, one type of supplemental information is a Universal Resource Locator (URL) to a TV network's web site where additional information relating to a TV program may be found. In one scenario for enhanced TV viewing, a viewer may watch a TV program and be notified of a related web site. The viewer may then obtain one or more web pages from the identified web site and display them either on the TV screen or on another display concurrently with viewing the TV program.

When viewers watch TV, it is common for the viewers to follow multiple programs on different channels concurrently. For example, a person might be watching a movie on one channel while periodically checking the score of a football game shown on another channel. In another example, a family watching a national news program on a cable channel might want to switch to a local channel when the local weather report is broadcast. Currently, picture in picture (PIP) technology allows viewers to monitor programs on two channels simultaneously by using two tuners, each tuner receiving one channel and displaying the received program on a selected area of the TV screen. However, there is no mechanism for notifying viewers of interesting program events happening on multiple channels when only one program is being displayed. Thus, the viewer must frequently switch back and forth between channels to monitor what is being shown on different channels. This unnecessarily interrupts viewing of the primary program currently being watched by the TV viewer.

BRIEF DESCRIPTION OF THE DRAWINGS

The features and advantages of the present invention will become apparent from the following detailed description of the present invention in which.

DETAILED DESCRIPTION

An embodiment of the present invention improves enhanced TV programming such that TV viewers watching one channel may be notified of interesting programming events happening or about to happen on other channels. The present invention overcomes the problem addressed by "surfing TV channels" by providing notifications that alert enhanced TV viewers to other programming events happening or about to happen on different channels that are not presently being watched. This enables the viewer to watch a primary program on one channel without interruption and be timely notified about interesting programming events about to occur on other channels. The viewer then may have the option of switching to another channel based on the information included with the event notification.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Figure 1:
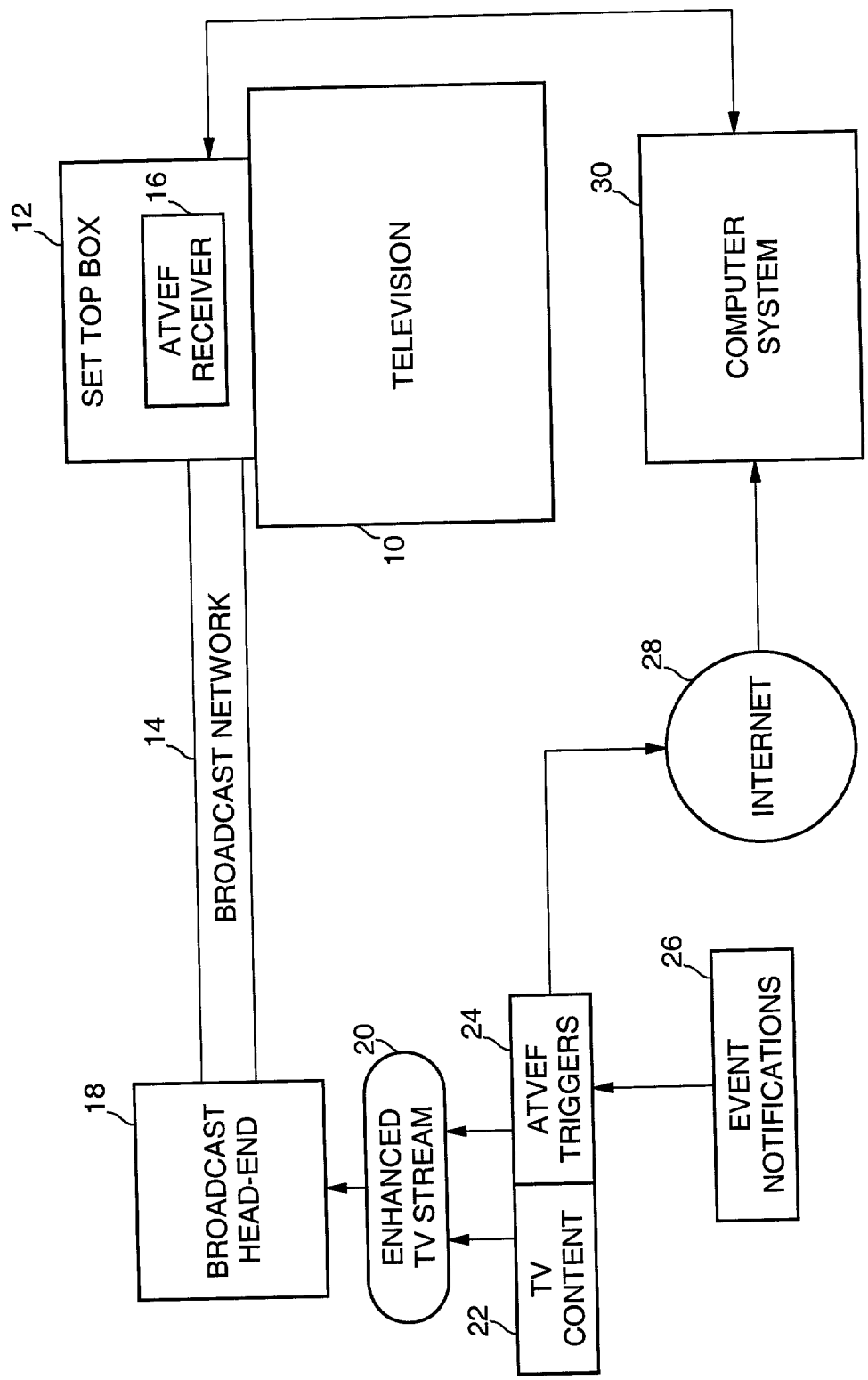
FIG. 1 is a diagram of a system for providing event notifications according to an embodiment of the present invention.

FIG. 1 is a diagram of a system for providing event notifications according to an embodiment of the present invention. A television (TV) 10 may be coupled to a set top box 12 for receiving digital TV (DTV) broadcasts via a broadcast network 14. The set top box may be configured to receive digital broadcast TV signals via a broadcast network comprising an antenna, cable, satellite dish, a computer network (such as the Internet for example), or any other suitable transmission mechanism. In some embodiments, the set top box may be integral with the TV 10 or other associated consumer electronics or computer products.

Set top box 12 comprises ATVEF receiver 16. The receiver decodes and plays ATVEF content. Generally, the ATVEF receiver may be a software product being executed by a processor within the set top box, but may also comprise hardware circuitry within the set top box. In one embodiment, the ATVEF receiver processes the DTV broadcast signal to extract enhanced content in accordance with the ATVEF Specification. Extraction of enhanced content may comprise, at least in part, processing the received DTV signal to strip the received signal of triggers, execute a software script, segregate data or data structures, or other methods of separating data into groupings. Enhanced content extracted from a DTV broadcast signal may include a variety of enhanced TV resources such as ATVEF triggers to update information displayed on a visual display (such as the screen of TV 10 or another monitor), Universal Resource Locators (URLs), metadata, scripts, Java applets, HTML, web pages, images, or other useful data. The TV viewer may then interact with the enhanced content obtained from the set top box and TV to enrich the viewing experience. For example, enhanced TV broadcasts may use triggers and scripts to change the banners on web pages to tie in with a TV program or to change web pages being displayed on a portion of the TV screen or other monitor communicatively coupled with the TV or set top box.

Broadcast head-end 18 broadcasts the DTV signal to the set top box 12 over the broadcast network 14 using well known methods. The broadcast head-end accepts an enhanced TV stream 20 which may be reformatted by the broadcast head-end into the DTV signal broadcast over the broadcast network. The broadcast head-end may also be known as a transport operator. A transport operator runs a video delivery infrastructure that includes a transport for ATVEF data. The enhanced TV stream 20 may be created by a content creator (not shown). The content creator originates the content components of the enhancement including audio, video, graphics, layout, interaction and triggers. The content creator creates the enhanced TV stream to comprise the TV content 22 (e.g., one or more TV programs having at least audio and video portions) and zero or more ATVEF triggers 24. The content creator may be a broadcasting network, a TV production company, or other television programming entity. In one embodiment, the content creator may be the same entity as the entity operating the broadcast head-end or transport operator. As noted above, enhanced TV allows a content creator to integrate TV programs with relevant data enhancements. The ATVEF Specification provides content creators with a reliable definition of how to deliver enhanced programming over a variety of transport mechanisms to compliant receivers. Some embodiments of the present invention use the protocol defined by the ATVEF Specification to create program event notifications and deliver them to any intelligent and compliant receiver, such as set top box 12. In some embodiments, event notifications 26 may be data enhancements implemented as ATVEF packages and triggers that may be executed at the receivers (e.g., set top boxes and/or TVs).

ATVEF triggers are described in the ATVEF Specification in section 1.1.5. Triggers are real-time events delivered for an enhanced TV program. In one embodiment, a trigger may be included in a single Internet Protocol (IP) multicast packet delivered on the address and port defined in an announcement for an enhanced TV program. In another embodiment for analog TV, triggers may be transmitted on vertical blanking interval (VBI) line 21 of a National Television Standards Committee (NTSC) television signal. ATVEF Receiver 16 may set a policy for allowing users to turn on or turn off enhanced TV content, and can use a trigger arrival as a signal to notify users of enhanced content availability. Triggers may include a URL, and may optionally include a human-readable name, an expiration date, and a script. The ATVEF Receiver determines how to interpret triggers received from the broadcast head-end. In the present invention, the ATVEF Receiver may interpret a received trigger as an event notification of something of interest happening or about to happen in a program being broadcast on a channel other than the one currently being viewed.

In order to alert viewers to interesting events happening or about to happen on other channels not currently being watched, the events must first be identified. Content creators for TV programming may decide in advance which program segments constitute interesting events for a viewer. In one embodiment, an event may signify the starting of a program segment. In another embodiment, an event may signify that a program segment may be commencing after a predetermined time period from the current time (e.g., program segment X starts on channel Y in 30 seconds from now). Generally, selected portions of each TV program may be identified as separate discrete events to be registered for by a viewer. For example, in a news program, possible events may comprise presentation of the national news, the local news, the national weather report, the local weather report, sports scores, sports highlights, daily financial information, local human interest stories, and so on. In another example, in a sports program such as the broadcasting of a football game, possible events may comprise scoring plays, the two minute warning, plays gaining over 20 yards, long passes, interceptions, fumbles, and so on. In yet another example, in a drama program, possible events may comprise important scenes furthering the plot of the program. As can be appreciated, any portion of any TV program may be identified as an event of interest to a viewer. Each event may be assigned a globally unique identifier. Furthermore, the portion of the TV program may be pre-recorded, or may be part of a live broadcast. For a live broadcast, events occurring in real-time may be tagged or otherwise identified as they happen, either manually or automatically, by the broadcast head-end or content creator.

In one embodiment, viewers may subscribe or register for event notifications through a user interface available at the set top box. For example, the viewer may be presented with a list of events on the TV or other monitor for one or more selected programs on one or more selected channels of interest (e.g., show all news segment events of a local news program). In one embodiment, a dedicated TV channel may be used for advertising program events. The viewer may select this channel to view a list of events to register or subscribe to. In another embodiment, the events may be identified in printed form, such as in a daily newspaper, or a magazine, or a program guide, or in an electronic form such as an electronic program guide (EPG). The viewer may then select, using any suitable user interface communicatively coupled with the set top box, zero or more events. For example, the viewer may select events of interest using well-known user interface mechanisms such as using a TV remote control or a mouse. The selected events may be compiled and stored by the set top box as the set of registered events for a given viewer.

The set top box may in some embodiments store individual sets of registered events for multiple viewers. In this case, a viewer may need to identify himself or herself to the set top box when starting watching TV so that the set top box knows which events are currently of interest. When an event occurs that is of interest to a current viewer, the set top box may present a notification of the event to the viewer. The set top box may parse or filter event notifications received from the broadcast head-end over the broadcast network to take further action on only those events selected as interesting by the current viewer.

In one embodiment, the notification may comprise a visual signal to the viewer that an event of interest has occurred. The event may indicate that something of interest is occurring or about to occur. For example, a banner may appear textually informing the viewer of the event. In other embodiments, the notification may be audible. The viewer may then change the channel as desired. In one embodiment, the channel being viewed may be automatically changed by the set top box to another channel when the event occurs (e.g., change the currently displayed channel to the channel having the desired event). This causes the primary program being displayed for viewing by the viewer to be changed to display another program. In one embodiment, the program from the new channel may be displayed in one portion of the TV screen concurrently with the display of the existing primary program in another portion of the screen.

The set of events registered for by a viewer may occur on multiple channels. For example, a viewer may desire to register for ten different events, with two events potentially occurring in programs broadcast on channel 4, four events potentially occurring in programs broadcast on channel 11, one event potentially occurring in a program broadcast on channel 32, and three events potentially occurring in programs broadcast on channel 156. In addition, a single event may in some instances occur on more than one channel. In that case, the viewer may be presented with a choice of channels in order to view the program segment associated with the event.

There may be at least three transport mechanisms used in embodiments of the present invention for sending event notifications to a viewer. In one embodiment, the set top box or TV includes two tuners. One tuner may be used to receive the TV program currently being watched, while the second tuner is typically used for a value added service such as PIP. Instead of PIP however, in some embodiments of the present invention the second tuner tunes to a second broadcast channel that carries current event notifications sent from the broadcast head-end to the set top box. In another embodiment, the set top box or TV may include only one tuner (for receiving the TV program being watched), but the viewer also has one or more other devices (such as a PC, consumer electronics equipment, cell phone, personal digital assistant (PDA), and the like) having a connection to a communications network such as the Internet. In this case, an Internet protocol (IP) multicast channel may be used as a transport mechanism to deliver event notifications in ATVEF triggers to the viewer's site.

As shown in FIG. 1, the ATVEF triggers representing event notifications may be communicated in data packets through the Internet to a computer system 30 communicatively coupled to the set top box. Although represented as computer system 30 in FIG. 1, this device may be any computing device capable of receiving data over a network such as the Internet. In one embodiment, the set top box connects to the Internet for receiving the ATVEF triggers and a separate computer system is not used. In still another embodiment, the set top box or TV includes only one tuner and there is no network connection. In this case, event notifications may be sent on the same TV channel along with the primary program. This may require broadcasters to cooperate by providing bandwidth on their channels to other broadcast networks for carrying event notifications for a plurality of programs and channels. For DTV, the broadcast signal may include data packets having event notification data relating to events on other channels.

Although ATVEF and ATVEF triggers are discussed herein as a transport mechanism for conveying the event notifications to the viewer, the invention is not limited in scope in this respect. Any communications protocol, now known or developed in the future, that communicates the event notifications from the broadcast head-end to the set top box and/or TV in a timely manner may be employed.

Figure 2:
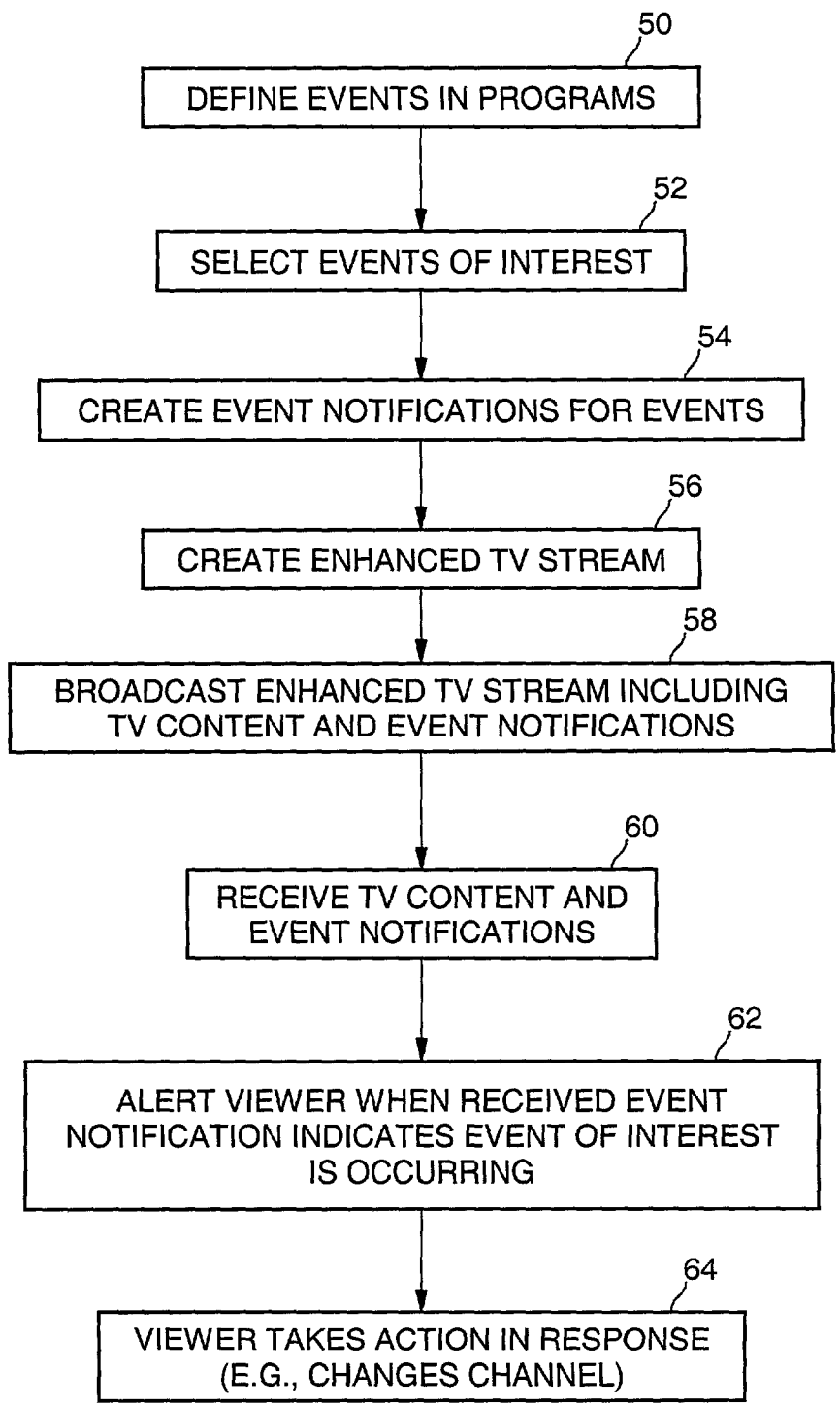
FIG. 2 is a flow diagram illustrating providing and processing of event notifications according to an embodiment of the present invention.

FIG. 2 is a flow diagram illustrating providing and processing of event notifications according to an embodiment of the present invention. At block 50, the broadcaster or content creator defines events for a program to be or being broadcast. In one scenario, a broadcaster or content creator may define a set of events for every prerecorded program in a broadcast schedule. For example, if a cable TV or satellite TV company operates a broadcast network having multiple channels, the cable TV or satellite company may define the events for all programs broadcast on all channels or any subsets thereof. The broadcaster may also define events in real-time for live shows (e.g., sports events, major news events, and so on).

An event, in general, may be anything happening or about to happen in a program. In one embodiment, the description of an event may be prescribed or standardized throughout the broadcast industry. For example, extended markup language (XML) or another suitable descriptive language may be used to define a schema of event descriptions that may be used by all broadcasters and content creators.

In one simple illustrative, non-limiting example, an event description definition may be:

```
<program> Program_Name </program>
<fragment> Event_Name </fragment>
<event_type> Event_Type_Name </event_type>
<channel> Channel_Name </channel>
``` whereas, a corresponding specific event description may be:

```
<program> College Football Weekly Game</program>
<fragment> Scoring_Play_Touchdown </fragment>
<event_type> Sports_Highlights </event_type>
<channel> Channel_148 </channel>
```

In a more detailed example, in one embodiment of the present invention, a schema for defining events representing program segments may be:

```
<program name="" channel="" network="">
    <fragments>
      <fragment>
        <event_name></event_name>
        <event_type></event_type>
        <event_description></event_description>
      </fragment>
      . . .
      . . .
    </fragments>
</program>
<AttributeType name="name" dt:type="string" />
<AttributeType name="channel" dt:type="string" />
<AttributeType name="network" dt:type="string" />
<ElementType name="event_name" content="textOnly"
dt:type="string" />
<ElementType name="event_type" content="textOnly"
dt:type="string" />
<ElementType name="event_description" content="textOnly"
dt:type="string" />
<ElementType name="fragment" content="eltOnly" order="many">
    <element type="event_name" minOccurs="1" maxOccurs="1" />
    <element type="event_type" minOccurs="1" maxOccurs="1" />
    <element type="event_description" minOccurs="0" maxOccurs="1" />
</ElementType>
<ElementType name="fragments" content="eltOnly" order="many">
    <element type="fragment" minOccurs="0" maxOccurs="*" />
</ElementType>
<ElementType name="program" content="eltOnly" order="many">
    <attribute type="name" required="yes" />
    <attribute type="channel" required="yes" />
    <attribute type="network" required="yes" />
    <element type="fragments" minOccurs="0" maxOccurs="1" />
</ElementType>
```

Here are two examples of using this definition of an event representing a program segment:

```
<program name="News Channel 8" channel="8" network="NBC">
  <fragments>
    <fragment>
      <event_name>Local Weather</event_name>
      <event_type>News_Weather_Report</event_type>
      <event_description>Weather with Michael Smith
      </event_description>
    </fragment>
    <fragment>
      <event_name>Sports Channel 8</event_name>
      <event_type>News_Sports_Report</event_type>
      <event_description>Sports News with John Smith
      </event_description>
    </fragment>
  </fragments>
</program>
<program name="Monday Night Football" channel="2"
network="ABC">
  <fragments>
    <fragment>
      <event_name>Scoring Play Touchdown</event_name>
      <event_type> Sports_Football_Touchdown </event_type>
      <event_description>
          Scoring Touchdown Info and Current Score
      </event_description>
    </fragment>
    <fragment>
      <event_name>Scoring Play Field Goal<event_name>
      <event_type>Sports_Football_Field_Goal<event_type>
      <event_description>
          Scoring Field Goal Info and Current Score
      </event_description>
    </fragment>
  </fragments>
</program>
```

An example of a schema for defining an event notification follows:

```
<event_notification name="" channel="" network="">
  <event_name></event_name>
  <event_type></event_type>
  <event_description></event_description>
  <event_notification>
  <AttributeType name="name" dt:type="string" />
  <AttributeType name="channel" dt:type="string" />
  <AttributeType name="network" dt:type="string" />
  <AttributeType name="real_time" dt:type="boolean" />
  <ElementType name="event_name" content="textOnly"
  dt:type="string" />
  <ElementType name="event_type" content="textOnly"
  dt:type="string" />
  <ElementType name="event_description" content="textOnly"
  dt:type="string" />
  <ElementType name="event_notification" content="eltOnly"
  order="many">
    <attribute type="name" required="yes" />
    <attribute type="channel" required="yes" />
    <attribute type="network" required="yes" />
    <attribute type="real_time" required="yes" />
    <element type="event_name" minOccurs="1" maxOccurs="1" />
    <element type="event_type" minOccurs="1" maxOccurs="1" />
    <element type="event_description" minOccurs="0"
    maxOccurs="1" />
  </ElementType>
```

Here are two examples of using this definition of an event notification:

```
<event_notification name="News Channel 8" channel="8"
network="NBC" real_time="0">
  <event_name>Local Weather Report</event_name>
  <event_type> News_Weather_Report </event_type>
  <event_description>
    Weather with Michael Smith: Tornado Alert for Monday July 9, 2001
```

```
  </event_description>
</event_notification>
<event_notification name="ABC Monday Night Football" channel="2"
network="ABC" real_time="1">
  <event_name>Scoring Play Touchdown</event_name>
  <event_type>Sports_Football_Touchdown</event_type>
  <event_description>
     Jack Smith of Miami Scores a Touchdown. New York 10 : Miami 13
  </event_description>
</event_notification>
```

Once the events and corresponding event notifications are defined by the broadcaster or content creator, in one embodiment the event definitions may be communicated to the set top box, either via the broadcast network or via a back channel such as the Internet or telephone line. The set top box receives the event definitions and presents them to the viewer for selection. Alternatively, the event definitions may be presented to the viewer in some other form, such as a printed publication distributed through the mail or by other means, or an electronic program guide. At block 52 of FIG. 2, the viewer uses a user interface operated by the set top box to select events of interest for one or more programs. At block 54, prior to or contemporaneous with broadcasting of programs, the broadcaster or content creator generates event notifications for events occurring in the programs being broadcast. This may be done for all programs on all channels or any subset thereof. In one embodiment, the event notifications comprise ATVEF triggers. At block 56, the broadcaster creates the enhanced TV stream by combining the TV content with the generated event notifications (e.g., ATVEF triggers). At any given point in time, there may be zero or more event notifications for a portion of the enhanced TV stream.

At block 58, the broadcaster broadcasts the enhanced TV stream, including the TV content (for one or more programs) and zero or more event notifications. Depending on the transport mechanism used, the event notifications may be transmitted over the Internet, on a selected specialized channel for event notifications, or embedded within the same channel as a program. Similar to a TV program, event notifications may be recorded and/or replayed or rebroadcast. At block 60, the set top box receives the TV content over the broadcast network, and the event notifications over either the broadcast network or the Internet (via a computer system, the set top box itself, or another device). Once the set top box receives the event notifications, the set top box compares the received event notifications with the set of events of interest selected by the viewer. If any event is occurring or about to occur according to the received event notifications that matches or corresponds to a viewer selected event, the set top box alerts or otherwise notifies the viewer at block 62. At block 64, the viewer may then change the channel to view the program event. Optionally, the set top box may change the channel or cause the channel to be changed automatically (e.g., without viewer interaction).

Thus, in one embodiment the present invention uses ATVEF triggers to allow a viewer to watch a TV program broadcast on one channel without interruption, yet be automatically notified when selected events of interest occur in programs being broadcast on other channels.

The techniques described herein are not limited to any particular hardware or software configuration; they may find applicability in any computing or processing environment. The techniques may be implemented in hardware, software, or a combination of the two. The techniques may be implemented in programs executing on programmable machines such as set top boxes, digital televisions, mobile or stationary computers, personal digital assistants, and similar devices that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices.

Each program may be implemented in a high level procedural or object oriented programming language to communicate with a processing system. However, programs may be implemented in assembly or machine language, if desired. In any case, the language may be compiled or interpreted.

Each such program may be stored on a storage medium or device, e.g., compact read only memory (CD-ROM), digital versatile disk (DVD), hard disk, magnetic disk, or similar medium or device, that is readable by a general or special purpose programmable machine for configuring and operating the machine when the storage medium or device is read by the computer to perform the procedures described herein. The system may also be considered to be implemented as a machine-readable storage medium, configured with a program, where the storage medium so configured causes a machine to operate in a specific manner. Other embodiments are within the scope of the following claims.

While this invention has been described with reference to illustrative embodiments, this description is not intended to be construed in a limiting sense. Various modifications of the illustrative embodiments, as well as other embodiments of the invention, which are apparent to persons skilled in the art to which the inventions pertains are deemed to lie within the spirit and scope of the invention.

APPENDIX A

William E. Alford, Reg. No. 37,764; Farzad E. Amini, Reg. No. 42,261; William Thomas Babbitt, Reg. No. 39,591; Carol F. Barry, Reg. No. 41,600; Jordan Michael Becker, Reg. No. 39,602; Lisa N. Benado, Reg. No. 39,995; Bradley J. Bereznak, Reg. No. 33,474; Michael A. Bernadicou, Reg. No. 35,934; Roger W. Blakely, Jr., Reg. No. 25,831; R. Alan Burnett, Reg. No. 46,149; Gregory D. Caldwell, Reg. No. 39,926; Andrew C. Chen, Reg. No. 43,544; Thomas M. Coester, Reg. No. 39,637; Donna Jo Coningsby, Reg. No. 41,684; Florin Corie, Reg. No. 46,244; Dennis M. deGuzman, Reg. No. 41,702; Stephen M. De Klerk, Reg. No. P46,503; Michael Anthony DeSanctis, Reg. No. 39,957; Daniel M. De Vos, Reg. No. 37,813; Justin M. Dillon, Reg. No. 42,486; Sanjeet Dutta, Reg. No. P46,145; Matthew C. Fagan, Reg. No. 37,542; Tarek N. Fahmi, Reg. No. 41,402; Mark W. Farrell, Reg. No. 45,988; George Fountain, Reg. No. 37,374; James Y. Go, Reg. No. 40,621; James A. Henry, Reg. No. 41,064; Willmore F. Holbrow III, Reg. No. P41,845; Sheryl Sue Holloway, Reg. No. 37,850; George W Hoover II, Reg. No. 32,992; Eric S. Hyman, Reg. No. 30,139; William W. Kidd, Reg. No. 31,772; Sang Hui Kim, Reg. No. 40,450; Walter T. Kim, Reg. No. 42,731; Eric T. King, Reg. No. 44,188; George B. Leavell, Reg. No. 45,436; Kurt P. Leyendecker, Reg. No. 42,799; Gordon R. Lindeen III, Reg. No. 33,192; Jan Carol Little, Reg. No. 41,181; Robert G. Litts, Reg. No. 46,876; Julio Loza, Reg. No. 47,758; Joseph Lutz, Reg. No. 43,765; Michael J. Mallie, Reg. No. 36,591; Andre L. Marais, under 37 C.F.R. §10.9(b); Paul A. Mendonsa, Reg. No. 42,879; Clive D. Menezes, Reg. No. 45,493; Chun M. Ng, Reg. No. 36,878; Thien T. Nguyen, Reg. No. 43,835; Thinh V. Nguyen, Reg. No. 42,034; Dennis A. Nicholls, Reg. No. 42,036; Daniel E. Ovanezian, Reg. No. 41,236; Kenneth B. Paley, Reg. No. 38,989; Gregg A. Peacock, Reg. No. 45,001; Marina Portnova, Reg. No. P45,750; Michael A. Proksch, Reg. No. 43,021; William F. Ryann, Reg. 44,313; James H. Salter, Reg. No. 35,668; William W. Schaal, Reg. No. 39,018; James C. Scheller, Reg. No. 31,195; Jeffrey S. Schubert, Reg. No. 43,098; George Simon, Reg. No. P47,089; Maria McCormack Sobrino, Reg. No. 31,639; Stanley W. Sokoloff, Reg. No. 25,128; Edwin H. Taylor, Reg. No. 25,129; Lance A. Termes, Reg. No. 43,184; John F. Travis, Reg. No. 43,203; Joseph A. Twarowski, Reg. No. 42,191; Kerry D. Tweet, Reg. No. 45,959; Mark C. Van Ness, Reg. No. 39,865; Thomas A. VanZandt, Reg. No. 43,219; Lester J. Vincent, Reg. No. 31,460; Glenn E. Von Tersch, Reg. No. 41,364; John Patrick Ward, Reg. No. 40,216; Mark L. Watson, Reg. No. P46,322; Thomas C. Webster, Reg. No. P46,154; and Norman Zafman, Reg. No. 26,250; my patent attorneys, and Firasat Ali, Reg. No. 45,715; Richard Nakashima, Reg. No. 42,023, my patent agents of BLAKELY, SOKOLOFF, TAYLOR & ZAFMAN LLP, with offices located at 12400 Wilshire Boulevard, 7th Floor, Los Angeles, Calif. 90025, telephone (310) 207-3800, and and Alan K. Aldous, Reg. No. 31,905; Robert D. Anderson, Reg. No. 33,826; Joseph R. Bond, Reg. No. 36,458; Richard C. Calderwood, Reg. No. 35,468; Jeffrey S. Draeger, Reg. No. 41,000; Cynthia Thomas Faatz, Reg No. 39,973; Sean Fitzgerald, Reg. No. 32,027; John F. Kacvinsky, Reg No. 40,040; Seth Z. Kalson, Reg. No. 40,670; David J. Kaplan, Reg. No. 41,105; Leo V. Novakoski, Reg. No. 37,198; Naomi Obinata, Reg. No. 39,320; Thomas C. Reynolds, Reg. No. 32,488; Kenneth M. Seddon, Reg. No. 43,105; Mark Seeley, Reg. No. 32,299; Steven P. Skabrat, Reg. No. 36,279; Howard A. Skaist, Reg. No. 36,008; Robert G. Winkle, Reg. No. 37,474; Steven D. Yates, Reg. No. 42,242, and Charles K. Young, Reg. No. 39,435; my patent attorneys, Thomas Raleigh Lane, Reg. No. 42,781; Calvin E. Wells; Reg. No. P43,256, Peter Lam, Reg. No. 44,855; and Michael J. Nesheiwat, Reg. No. P47,819; my patent agents, of INTEL CORPORATION; and James R. Thein, Reg. No. 31,710, my patent attorney; with full power of substitution and revocation, to prosecute this application and to transact all business in the Patent and Trademark Office connected herewith.

What is claimed is:

1. A method comprising:
   receiving a digital television stream;
   causing the display of a first program of a first television channel received in the television stream for viewing by a viewer using a first tuner;
   detecting an event notification on a third channel using a second tuner, said second tuner being different than said first tuner;
   notifying the viewer of viewer selected content available for viewing in a second program on a second television channel being broadcast concurrently with the first program by transmitting a notification over a third television channel; and
   automatically causing the changing of the channel after the event occurs to display the second program of the second channel instead of the first program.

2. The method of claim 1, wherein the television stream comprises an enhanced television stream.

3. The method of claim 2, further comprising receiving an event notification within the enhanced television stream, the event notification indicating occurrence of the event.

4. The method of claim 1, further comprising concurrently causing the display of the first program on a first portion of a display and the second program on a second portion of the display.

5. The method of claim 1, further comprising identifying portions of programs as signifying events.

6. The method of claim 1, further comprising registering for notification of events.

7. The method of claim 6, further comprising receiving a plurality of event notifications, filtering the event notifications to identify those event notifications corresponding to registered events, and notifying the viewer of occurrences of registered events for which event notifications have been received.

8. The method of claim 6, wherein registered events occur in programs broadcast on a plurality of channels.

9. The method of claim 1, wherein the second program is broadcast live and the event is determined in real-time.

10. An article comprising:
a non-transitory computer readable storage medium having a plurality of machine readable instructions, wherein when the instructions are executed by a processor, the instructions provide for handling of event notifications in television programming, the instructions including receiving a digital television stream, cause the display of a first program of a first television channel received in the television stream for viewing by a viewer using a first tuner, detecting an event notification on a third channel using a second tuner, notifying the viewer of viewer selected content available for viewing in a second program on a second television channel being broadcast concurrently with the first program by transmitting a notification over a third television channel, said first tuner being different than said second tuner, and causing the changing of the channel after the event occurs to cause the display of the second program of the second channel instead of the first program.

11. The article of claim 10, wherein the television stream comprises an enhanced television stream.

12. The article of claim 11, further comprising instructions for receiving an event notification within the enhanced television stream, the event notification indicating occurrence of the event.

13. The article of claim 10, further comprising instructions for concurrently causing the display of the first program on a first portion of a display and the second program on a second portion of the display.

14. The article of claim 10, further comprising instructions registering for notification of events.

15. The article of claim 14, further comprising instructions for receiving a plurality of event notifications, filtering the event notifications to identify those event notifications corresponding to registered events, and notifying the viewer of occurrences of registered events for which event notifications have been received.

* * * * *